(12) United States Patent
Beach et al.

(10) Patent No.: US 6,309,452 B1
(45) Date of Patent: Oct. 30, 2001

(54) WET RUB RESISTANT INK COMPOSITIONS

(75) Inventors: Bradley L. Beach, Lexington, KY (US); Ameeta B. Madhava, Mountain View, CA (US); Anna M. Pearson, Richmond; Ajay K. Suthar, Lexington, both of KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/452,779

(22) Filed: Dec. 2, 1999

(51) Int. Cl.[7] .................................................. C09D 11/00
(52) U.S. Cl. .................... 106/31.27; 106/31.6; 503/214; 503/215
(58) Field of Search ............................ 106/31.27, 31.6; 503/214, 215

(56) References Cited

U.S. PATENT DOCUMENTS

| | | |
|---|---|---|
| 4,273,847 | 6/1981 | Lennon et al. . |
| 4,686,547 * | 8/1987 | Hayashi et al. ................. 503/207 |
| 4,696,856 | 9/1987 | Okada et al. . |
| 4,749,679 * | 6/1988 | Yoshida et al. ................. 503/208 |
| 4,902,722 | 2/1990 | Melber . |
| 5,106,881 | 4/1992 | Inoue et al. . |
| 5,173,363 | 12/1992 | Fitch . |
| 5,194,317 | 3/1993 | Sato et al. . |
| 5,330,565 | 7/1994 | Saitoh et al. . |
| 5,354,724 * | 10/1994 | Hoffmann et al. ............... 503/209 |
| 5,596,027 | 1/1997 | Mead et al. . |

* cited by examiner

*Primary Examiner*—C. Melissa Koslow
*Assistant Examiner*—Veronica F. Faison
(74) *Attorney, Agent, or Firm*—Jacqueline M. Daspit; Geoffrey L. Oberhaus

(57) ABSTRACT

A wet rub resistant ink composition comprises, by weight, at least about 15% carrier medium, colorant in an amount of no more than about 20%, and at least about 2% polymeric capsules having central cavities containing water. The composition is substantially free of film-forming resins. The ink composition may be used in combination with other ink compositions having different colors or shades to increase the color gamut of an ink system.

47 Claims, 2 Drawing Sheets

WET RUB RESISTANT INK COMPOSITIONS

FIELD OF INVENTION

This invention relates to ink compositions. More particularly, the invention relates to wet rub resistant ink compositions.

BACKGROUND OF INVENTION

Ink jet printing is a well-known printing technique by deposition of an ink composition from a reservoir onto a substrate. The deposition is conventionally accomplished by spraying droplets of the ink composition from the reservoir, without having the reservoir touch the substrate. By controlling the location of deposit of the droplets, images or printed characters are formed on a surface of the substrate.

Ink compositions typically contain an aqueous carrier medium and a colorant. The colorant may be a pigment, a dye or a mixture thereof. The colorant imparts color to the ink composition, and in turn, to the substrate after printing. As used herein, "pigment" refers to a colorant that does not dissolve in the ink composition. As used herein, "dye" refers to a colorant that dissolves in the ink composition.

Wismer et al., U.S. Pat. No. 4,007,141, disclose opaque films comprising a film-forming binder material and discrete particles which contain cells or voids. Wismer et al. teach that the opaque films may optionally contain dyes or pigments, and that the discrete particles act as an opacifying agent.

Loria et al., U.S. Pat. No. 4,880,465, disclose an ink composition having dye compounds and no pigment. Loria et al. teach that the ink composition contains opacifying agents, such as hollow microspheres filled with water, a resin component and a carrier. Loria et al. further teach that the ink composition dries after printing, wherein the water within the hollow microspheres evaporates to form an ink coating with air filled microvoids. The air filled microvoids scatter light, causing an opaque image to be produced.

Fasano, U.S. Pat. No. 5,135,568, discloses a method for improving the fluorescence of a coating by adding hollow polymer particles which scatter ultraviolet light and shorter wavelength visible light.

Mead et al., U.S. Pat. No. 5,596,027, disclose an ink composition for printing on substrates comprising a carrier, a colorant, a polyamine and an acidic resin. Mead et al. teach that the colorant may be selected from the group consisting of dyes, pigments, hollow microspheres and combinations thereof. Mead et al. further teach that the hollow microspheres are opacifying agents, and that the polyamine interacts with the acidic resin to provide a smear resistant and durable printed image.

Alexiou, U.S. Pat. Nos. 5,594,045 and 5,726,221, discloses correction fluid comprising a particulate opacifier, a water-soluble or water-dispersible binder, water, a di- or tri- or quaternary ammonium compound, and, optionally, hollow microspheres of hydrated alumina, alumina-silica alloy, or acrylate-styrene copolymer.

Substrates printed with ink compositions may smear when wetted and rubbed. Unfortunately, many prior art compositions require significant amounts of resins or polyamine compounds to achieve acceptable wet rub resistance, and these ingredients may interfere with other ingredients and adversely affect desired ink properties.

Accordingly, a need exists to minimize such smearing by improving properties of the ink composition such as wet rub resistance, without sacrificing other desired properties of the ink composition such as stability, maintainability, print quality, waterfastness and lightfastness. A need also exists to provide ink compositions having an optimal color gamut when used in combination with other ink compositions.

SUMMARY OF THE INVENTION

Accordingly, it is an object of this invention to provide improved ink compositions suitable for use in an ink jet printer.

It is another object of the invention is to provide ink compositions having improved wet rub resistance.

It is an additional object of the invention to provide pigmented ink systems having improved color gamuts.

In accordance with one aspect of the present invention, there is provided compositions containing carrier medium, colorant and polymeric capsules. The compositions are substantially free of a film-forming resin. The polymeric capsules each have a central cavity containing water.

In accordance with another aspect of the present invention, there is provided methods of applying ink compositions to substrates, wherein the ink compositions contain carrier medium, colorant and polymeric capsules having central cavities containing water. The methods include applying the ink composition to the substrate and then applying heat and pressure to the ink composition.

In accordance with another aspect of the present invention, there is provided ink systems having at least two ink compositions, wherein at least one ink composition contains a carrier medium, a colorant and polymeric capsules having central cavities containing water; wherein the ink composition is substantially free of a film-forming resin. Additional embodiments and advantages of the compositions, methods and systems will be apparent from the following detailed description.

In accordance with another aspect of the present invention, there is provided methods of applying ink compositions to substrates, wherein the ink compositions contain carrier medium, colorant and polymeric capsules having central cavities containing water. The methods include applying the ink composition to the substrate and then applying heat to the ink composition.

BRIEF DESCRIPTION OF THE DRAWINGS

The invention may be more fully understood in view of the drawings in which.

DETAILED DESCRIPTION

Figure 1:
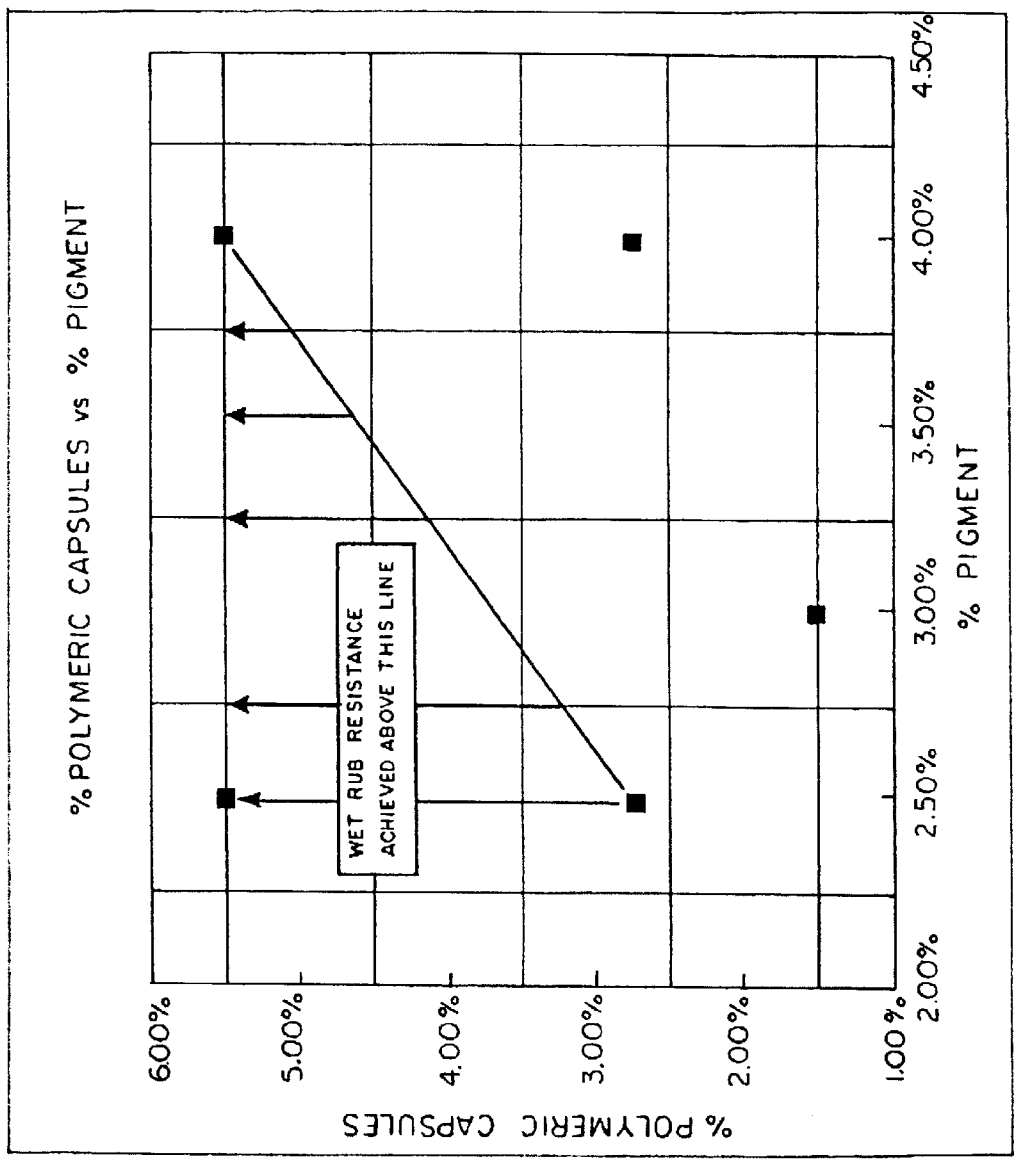
FIG. 1 is a graph showing a relationship between quantities of polymeric capsules and pigment, and wet rub resistance.

Conventional ink compositions often have film-forming resins, which may be employed to improve the gloss and wet rub resistance of the ink composition after it is applied to a substrate. Conventional ink compositions may additionally contain other components, for example polyamines, which are alleged to improve the wet rub resistance of the ink composition. The film-forming resins and polyamines often add to the complexity and expense of the ink compositions. The film-forming resins and polyamines may also be incompatible with other components used in ink compositions and, therefore, may preclude the presence of these other components. For example, polyamines react with anionic dispersants. As a result, polyamines and anionic dispersants are generally not used in the same ink compositions.

It has been found that the polymeric capsules having central cavities containing water improve the wet rub resistance of the ink composition, thereby negating any need for film-forming resins or polyamines to achieve wet rub resistance. Additionally, it has been found that the addition of polymeric capsules improves wet rub resistance with no significant increase in ink viscosity. Further, it has been found that the addition of polymeric capsules to ink compositions used in ink systems results in an increased color gamut.

The polymeric capsules may be prepared from any of the polymeric materials disclosed in Temple, U.S. Pat. No. 4,089,800, incorporated herein by reference. The polymeric capsule may comprise thermoplastic and/or thermosetting resins. Suitable thermoplastic resins include cellulose derivatives, such as ethyl cellulose, nitrocellulose, cellulose acetate, cellulose propionate and cellulose acetate butyrate; acrylic resins, such as homopolymers and copolymers of acrylic and methacrylic acid and their derivatives, such as methylacrylate, methyl methacrylate, ethyl acrylate, ethyl methacrylate, butyl acrylate, butyl methacrylate, acrylamide, acrylonitrile; polyolefins, such as polyethylene and polypropylene; polyamides; polycarbonates; polystyrene; copolymers of styrene and other vinyl monomers, such as acrylonitrile; vinyl polymers, such as homopolymers or copolymers of vinyl acetate, vinyl alcohol, vinyl chloride and vinyl butyral; and homopolymers and copolymers of dienes, such as polybutadiene, butadiene-styrene copolymers and butadiene acrylonitrile copolymers.

Suitable thermosetting resins include interpolymers of hydroxyl esters of ethylenically-unsaturated monomer, usually admixed with a crosslinking agent such as an aminoplast resin; admixtures of alkyd resins, usually admixed with a crosslinking agent such as an aminoplast resin; carboxylic acid amide interpolymers; ethylenically unsaturated polyester resins obtained by the condensation of a glycol and a polycarboxylic acid in combination with a vinylidene monomer; and epoxy resins. Alkyd resins are produced by the condensation of a polyhydric alcohol and a polycarboxylic acid.

Preferably the polymeric capsules are prepared from polymers selected from polystyrene and acrylic/styrene copolymers. More preferably the polymer is polystyrene and such a polymeric capsules comprise a polystyrene shell. In one embodiment the polymeric capsules comprise a shell consisting of polystyrene. Generally the cavities of the polymeric capsules contain water, preferably the cavities are substantially free of, more preferably free of, any ingredient other than water. In one embodiment the polymeric capsules are substantially transparent.

The polymeric capsules preferably have an outer diameter of less than about 1 micron, preferably less than about 0.5 micron, more preferably less than about 0.3 micron, and even more preferably from about 0.25 to about 0.3 micron. Preferred polymeric capsules may be obtained from ROHM & HAAS®, and are sold under the trade names ROPAQUE® OP-42, ROPAQUE® 62 and ROPAQUE® 62-LO. Alternatively, the polymeric capsules may be produced according to the methods described in Temple, U.S. Pat. No. 4,089,800.

The polymeric capsules improve the wet rub resistance of the ink composition to a degree that allows the elimination or the substantial elimination of film-forming resins. As used herein, the term "film-forming resins" means resins which form films upon drying and includes film-forming resins of the type which are well known in the art, for example as disclosed in U.S. Pat. Nos. 4,007,141; 4,880,465; and 5,596,027; each of which is incorporated herein by reference. Film-forming resins include resins formed from cellulose derivatives such as ethyl cellulose, nitrocellulose, cellulose acetate, cellulose propionate and cellulose acetate butyrate; homopolymers and copolymers comprising acrylic acid, methacrylic acid, or derivatives of acrylic acid and methacrylic acid, such as methy acrylate, acrylamide, acrylonitrile, and methyl methacrylate; polyolefins, such as polyethylene and polypropylene; polyamides, such as nylon; polycarbonates; polystyrene; copolymers comprising styrene and other vinyl monomers; homopolymers and copolymers of dienes such as polybutadiene, butadiene-styrene copolymers, and butadiene-acrylonitriles copolymers; condensation polymers such as alkyd resins; carboxylic acid amide interpolymers; interpolymers of hydroxyl-containing esters of unsaturated acids with ethylenically unsaturated monomers; and naturally occurring materials such as casein, shellac and gelatin.

As used herein, the term "film-forming resins" is intended to exclude the polymeric capsules having central cavities. Although the polymeric capsules may be formed from polymers generally thought of as capable of forming films, the polymeric capsules themselves are not film-forming. Thus, an ink composition may comprise polymers in the form of polymeric capsules yet be substantially free of film-forming resins. Preferably the ink compositions are substantially free of, more preferably are free of, film-forming resins. As used herein, "substantially free of film-forming resins" refers to compositions comprising less than about 5%, preferably less than about 2%, by weight film-forming resins.

The ink compositions are preferably substantially free of, more preferably are free of, additional components conventionally added to enhance wet rub resistance. Examples of such additional components include the polyamines disclosed in U.S. Pat. No. 5,596,027, such as ethylenediamine, polyethyleneimine, N,N'-bis(3-aminopropyl)-1,2-ethylenediamine, 1,4-bis(3-aminopropyl)piperazine, N,N'-bis(3-aminopropyl)-1,4-butanediamine, ethylenediamine, diethylenetriamine, triethylenetetramine, tetraethylenepentamine, nitrilotrisethylamine, N,N'-(diaminoethyl)piperazine, piperazinylethylethylenediamine, aminoethyltriethylenetetramine, aminoethylpiperazinylethylethylenediamine, piperazinylethyldiethylenetriamine, and pentaethylene hexamine. As used herein, "polyamines" is intended to include di- and tri-quaternary ammonium compounds such as tetramethylethylenediamine dibromide and N,N,N-trioctyl-N,N,N,N-pentamethyldiethylenetriamine tribromide. As used herein, "substantially free of" refers to compositions comprising less than about 5%, preferably less than about 2%, by weight of such additional components. In one embodiment the ink composition is substantially free of, more preferably is free of, polyamines.

The ink compositions contain colorants such as pigments and/or dyes. Any commonly employed organic or inorganic pigments may be used. Although polymeric capsules may add color or act as an opacifying agent in the ink composition, the polymeric capsules themselves are not considered to be a colorant. Thus, as used herein, the term "colorant" is intended to exclude polymeric capsules which are free of pigments or dyes, such as polymeric capsules comprising polymer shells and central cavities containing water. However, the term "colorant" is intended to include pigments or dyes which may be coated or encapsulated.

Pigments which are suitable colorants includes azo pigments such as condensed and chelate azo pigments; polycyclic pigments such as phthalocyanines, anthraquinones, quinacridones, thioindigoids, isoindolinones, and quinophthalones; nitro pigments, daylight fluorescent pigments; carbonates; chromates, titanium oxides; zinc oxides; iron oxides and carbon black. In one embodiment, the pigment is other than a white pigment, such as titanium dioxide. Preferred pigments employed in the ink composition include carbon black and pigments capable of generating a cyan, magenta and yellow ink. The pigments may be prepared via conventional techniques.

Suitable commercially available pigments include, for example, Pigment Red 81, Pigment Red 122, Pigment Yellow 13, Pigment Yellow 14, Pigment Yellow 17, Pigment Yellow 74, Pigment Yellow 83, Pigment Orange 5, Pigment Orange 30, Pigment Orange 34 and Pigment Blue 15:4.

The ink composition generally comprises a carrier medium which may be aqueous or organic. Preferably the carrier medium is an aqueous carrier medium. The aqueous carrier medium may comprise, for example, water, preferably distilled and/or deionized water, a water miscible organic solvent and combinations thereof. Suitable miscible organic solvents include glycols such as ethylene glycol, alcohols such as 1-propanol, glycol-ethers such as polyethylene glycol, diols such as 1,3-propane diol, or mixtures thereof. In one preferred embodiment, the aqueous carrier is deionized water.

Any suitable carrier medium may be employed, provided the carrier medium is capable of suspending the colorant. Suitable organic liquids that may be employed as the carrier medium include oils such as mineral oil, tung oil and soybean oil, as well as organic solvents such as polyethylene glycol, glycerol and 2-pyrrolidinone. Preferred organic liquids are polyethylene glycol, glycerol and 2-pyrrolidinone. In one embodiment, the carrier medium is substantially free of hydrophobic oils.

Dispersants may also be present in the ink composition to uniformly disperse the pigment. Any polymeric or non-polymeric dispersant which may be used to disperse a pigment in the ink composition may be employed. Preferably the dispersant is not film-forming, that is, the dispersant will not form a film upon drying. The term "polymeric dispersants," as used herein, is meant to include homopolymers, copolymers, terpolymers, immiscible and miscible polymer blends. Suitable non-polymeric dispersants include naphthalene sulfonic acid, sodium lignosulfate and glycerol stearate. Suitable polymeric dispersants includes random, block and branched polymers. When an aqueous carrier liquid is employed, the polymeric dispersants typically have hydrophilic segments for aqueous dispersibility and hydrophobic segments for pigment interaction.

Monomeric units which may be employed to make the polymeric dispersants include, for example, acrylic monomers, styrene monomers and monomers having amine groups. Preferred monomers include acrylic and methacrylic acid, acrylamide and methacrylamide.

Preferred polymeric dispersants are random terpolymers prepared from three monomeric precursors. Preferred precursors include monomeric and macromeric precursors, including at least one member selected from the group consisting of acrylates and methacrylates, at least one member selected from the group consisting of acryloyl- and methacryloyl-terminated polydialkylsiloxanes, and at least one member selected from the group consisting of stearyl acrylate, stearyl methacrylate, lauryl acrylate and lauryl methacrylate. Dispersants prepared with methacrylate, methacryloyl-terminated polydimethylsiloxane and stearyl methacrylate (22:1:1 molar ratio, respectively) are the most preferred.

The polymeric dispersants prepared may be made by polymerizing the monomeric and macromeric precursors via art-recognized techniques, which include free radical polymerizations.

The dispersants may be cationic, anionic, amphoteric and zwitterionic. Because our ink compositions have an acceptable wet rub resistance in the substantial absence of polyamine compounds, anionic dispersants may be used which otherwise may react with the polyamines. Such anionic dispersants include sulfonic acid salts, copolymers of polycarboxylic acids and polysiloxanes, solutions of polyamine amides and polycarboxylic acids, solutions of ammonium salts and fatty acids, and solutions of alkanolammonium salts and polyfunctional polymers. Specific anionic dispersants include TAMOL SN™, which is a sodium salt of condensed naphthalene sulfonic acid; BYK P-104S™ which is an unsaturated polycarboxylic acid with polysiloxane copolymer; BYKUMEN WS™, which is a solution of polyamine amides of unsaturated polycarboxylic acids; ANTI-TERRA™ 207, which is a solution of an alkylammonium salt of an unsaturated fatty acid; and DISPERBYK™ 181, which is a solution of an alkanolammonium salt of a polyfunctional polymer. As a result, a greater range of components may effectively be included in ink compositions according to the present invention.

The ink composition may further comprise additives such as a humectants, biocides, fungicides, bactericides, penetrants, surfactants, anti-kogation agents, anti-curling agents and buffers. Suitable humectants include glycols such as 2,2'-thiodiethanol, glycerol, 1,3-propanediol, 1,5-pentanediol, polyethylene glycol, ethylene glycol, diethylene glycol, propylene glycol and tetraethylene glycol; pyrrolidones such as 2-pyrrolidone; and alcohols such as n-propanol and isopropanol. Preferably the humectants are selected from the group consisting of 2,2'-thiodiethanol, glycerol, 1,3-propanediol, 1,5-pentanediol, polyethylene glycol, ethylene glycol, diethylene glycol, propylene glycol, tetraethylene glycol, 2-pyrrolidone, n-propanol and mixtures thereof.

Suitable biocides include benz-isothiazolin-one, methyl-isothizaolin-one, chloro-methyl-isothiazolin-one, sodium dehydroacetate, sodium sorbate, sodium 2-pyridinethiol-1-oxide, sodium benzoate and sodium pentachlorophenol. Examples of biocides are Proxel™, Givguard™, Canguard 327™ and Kathon® PFM.

The ink composition generally comprises, by weight, at least about 2%, preferably from about 2% to about 15%, more preferably from about 2% to about 10%, even more preferably about 4% to about 8%, polymeric capsules; from about 0.5% to about 20%, preferably from about 0.5% to about 10%, more preferably about 2.5% to about 6%, even more preferably from about 3% to about 5%, colorant; and at least about 15%, preferably from about 15% to about 75%, more preferably from about 15% to 65%, and even more preferably from about 30% to about 60%, carrier medium. FIG. 1 shows how the wet rub resistance may be controlled by variation of the relative amounts of polymeric capsules and pigment in the ink composition.

The ink composition may comprise, by weight, from about 0% to about 40% humectant; from about 0% to about 2% biocide; and from about 0% to about 7%, preferably from about 0.05% to about 6%, and most preferably from about 0.1% to about 4%, by weight, dispersant. In one embodiment the ink composition comprises, by weight, at least about 2% polymeric capsules; colorant in an amount of no more than about 20%, preferably no more than about 15%, more preferably no more than about 5%; at least about 15%, preferably at least about 40%, carrier medium; no more than about 40% humectant; no more than about 2% biocide; and no more than about 7% dispersant. In another embodiment the ink composition comprises, by weight, about 4% pigment and about 1% dispersant.

The ink composition can be made, for example, in a two stage process having a pigment dispersion stage and an ink preparation stage. In the pigment dispersion stage, agglomerates of pigment are reduced to a desired size by shear forces. To do so, a pre-mix composition is prepared by first mixing the pigment, a dispersant and deionized water in a mixer for about 30 minutes to provide adequate wetting of the pigment by the deionized water and dispersant. The pre-mix composition is then transferred to a mill which contains grinding media such as steel shot, zirconium oxide, yttrium treated zirconium, or polystyrene. The mill may be, for example, an attritor or a fine media mill. The pre-mix composition is milled until the agglomerates are reduced to the desired size, forming the ink concentrate. Generally, this median size desired is less than about 200 nm as measured by a Honeywell UPA 150 particle size analyzer. The ink preparation stage then comprises dilution of the ink concentrate while stirring with other ink components to obtain a final ink composition.

The ink compositions comprising carrier medium, colorant and polymeric capsules having central cavities containing water are applied to substrates. If desired, after the composition is applied to the substrate heat may be applied to the ink composition. In one embodiment after the composition is applied to the substrate heat and pressure are applied to the ink composition.

Preferably, the ink composition is applied to a substrate such as paper by an ink jet printer. After application to the paper, the ink composition may be heated and, optionally, pressed. A fuser assembly having at least one rotating heat roll may be used for heating, while fuser assembly having at least one rotating heat roll and at least one rotating pressure roll may be used for heating and pressing. The heat roll and pressure roll may be arranged in opposition to each other to form a nip. The paper is passed through the nip. Heat and pressure are applied as the paper passes between the rotating heat and pressure rolls. The rolls' speed of rotation may be adjusted, for example, to about 2.6 inches per second.

Generally heat is applied at a temperature of at least about 100 C., preferably from about 100 C. to about 250 C., more preferably about 150 C. to about 200 C. The pressure applied is generally at least about 10 pounds per square inch, preferably from about 10 to about 30 pounds per square inch, more preferably about 15 to about 25 pounds per square inch. In one embodiment the pressure is from about 18 to about 26 pounds per square inch. While not being bound by theory, it is believed that fusing the hollow polymeric capsule and colorants in the print results in the polymer adhering to both the colorant and the paper.

The ink composition may also be used as part of an ink system having at least two ink compositions. Generally, the ink system comprises at least two ink compositions having different colors or shades. Preferably, the ink system comprises at least one ink composition which comprises a colorant other than white pigment. The ink compositions are applied to the substrate in various combinations and amounts to provide a number of different colors. As used herein, "color gamut" refers to the number of different colors and shades that may be obtained with an ink system.

Preferably, the ink system comprises at least three ink compositions, with each ink composition being a primary color. In a preferred embodiment the ink system comprises a yellow ink composition, a magenta ink composition, and a cyan ink composition. At least one, preferably each, of the three ink compositions comprises polymeric capsules having central cavities containing water. In an ink jet printer, the three ink compositions are stored in three different wells, in fluid communication with an ink cartridge. The cartridge dispenses various amounts of each ink composition for spraying on the paper.

EXAMPLE 1

Nine ink compositions, containing components and amounts shown in Table 1 below, were prepared. Deionized water, 2,2'-thiodiethanol, polyethylene glycol with a molecular weight of 400, and 1-propanol were combined to form a first mixture. For inks numbers 1–2, 4–5 and 8–9, ink compositions according to the invention, hollow polymeric capsules made of polystyrene were added to the first mixture. The polymeric capsules had a measured outer diameter of 291 nm. The first mixture was then stirred for about 10 minutes. The inks numbers 3 and 6–7, control ink compositions according to the prior art, received no hollow polymeric capsules.

A concentrate containing deionized water, carbon black pigment and dispersant in a pigment to dispersant ratio of 5:1 was prepared and added to the first mixture to form the ink composition. Lexmark Terpolymer Dispersant Solution, prepared from methacrylic acid, polydimethylsiloxane and stearyl methacrylate monomers was used as the dispersant. The ink composition was stirred about 10 minutes.

TABLE 1

INK COMPOSITIONS

| INK # | Wt. % Hollow Polymeric Capsules | Wt. % Carbon Black | Wt. % 2,2'- Thiodi- ethanol | Wt. % PEG 400[1] | Wt. % 2- Propanol | Water |
|---|---|---|---|---|---|---|
| 1 | 2.75 | 2.5 | 10.0 | 10.0 | 2.0 | Balance |
| 2 | 2.75 | 1.0 | 10.0 | 10.0 | 2.0 | Balance |
| 3 | 0.00 | 2.5 | 10.0 | 10.0 | 2.0 | Balance |
| 4 | 5.50 | 4.0 | 10.0 | 10.0 | 2.0 | Balance |
| 5 | 5.50 | 1.0 | 10.0 | 10.0 | 2.0 | Balance |
| 6 | 0.00 | 4.0 | 10.0 | 10.0 | 2.0 | Balance |
| 7 | 0.00 | 1.0 | 10.0 | 10.0 | 2.0 | Balance |
| 8 | 2.75 | 4.0 | 10.0 | 10.0 | 2.0 | Balance |
| 9 | 5.50 | 2.5 | 10.0 | 10.0 | 2.0 | Balance |

[1]PEG 400 a.k.a. POLYETHYLENE GLYCOL 400

The pH of each ink composition was adjusted to between 8.2 and 8.5 by addition of a solution containing 20% by weight of KOH.

Each ink composition was tested in a Lexmark Color JetPrinter™ 2050, by printing on eleven types of paper, as shown in Table 2, and the optical density of each printed ink is also shown in Table 2.

TABLE 2

OPTICAL DENSITY RESULTS - BEFORE FUSER

| PAPER | Ink #1 | Ink #2 | Ink #3 | Ink #4 | Ink #5 | Ink #6 | Ink #7 | Ink #8 | Ink #9 |
|---|---|---|---|---|---|---|---|---|---|
| FORE DP | 1.05 | 0.87 | 1.18 | 1.32 | 0.87 | 1.08 | 0.82 | 1.19 | 1.43 |
| FOX RIVER | 1.48 | 1.25 | 1.44 | 1.33 | #.19 | 1.44 | 1.17 | 1.38 | 1.51 |
| LASER PRINT | 1.53 | 1.30 | 1.50 | 1.38 | 1.26 | 1.51 | 1.26 | 1.44 | 1.52 |
| X-9000 | 1.59 | 1.31 | 1.51 | 1.47 | 1.25 | 1.48 | 1.26 | 1.51 | 1.57 |
| 4200 DP | 1.36 | 1.10 | 1.27 | 1.40 | 1.02 | 1.36 | 1.02 | 1.41 | 1.39 |
| 1ST CHOICE | 1.55 | 1.34 | 1.51 | 1.35 | 1.29 | 1.54 | 1.27 | 1.49 | 1.53 |
| MSP | 1.33 | 1.09 | 1.25 | 1.39 | 1.10 | 1.32 | 1.06 | 1.38 | 1.38 |
| REGALIA | 1.46 | 1.18 | 1.38 | 1.32 | 1.21 | 1.43 | 1.18 | 1.40 | 1.45 |
| RELAY DP | 0.92 | 0.76 | 0.89 | 1.11 | 1.26 | 0.98 | 0.75 | 1.03 | 1.10 |
| TIDAL DP | 1.05 | 0.79 | 0.96 | 1.14 | 0.83 | 1.04 | 0.77 | 1.07 | 1.02 |
| XERO LASER | 1.40 | 1.23 | 1.37 | 1.32 | 1.21 | 1.35 | 1.12 | 1.37 | 1.45 |

The above types of paper were used to provide test results on a range of relative paper quality, with the higher quality papers being Fox River, Laser Print, X-9000, 4200 DP, 1st Choice, Regalia and Xero Laser paper. The optical density data of Table 2 was therefore averaged as shown in Table 3.

After applying the same ink compositions to the paper, the paper was passed through a fuser assembly having two rotating rollers arranged to form a nip. The rollers were heated to 200 C., and exerted a pressure of 22 pounds towards one another. The optical density of each ink composition on different types of paper is shown in Table 4.

TABLE 4

OPTICAL DENSITY RESULTS - AFTER FUSER ASSEMBLY

| PAPER | Ink #1 | Ink #2 | Ink #3 | Ink #4 | Ink #5 | Ink #6 | Ink #7 | Ink #8 | Ink #9 |
|---|---|---|---|---|---|---|---|---|---|
| FORE DP | 1.00 | 0.84 | 1.19 | 1.23 | 0.86 | 1.05 | 0.81 | 1.14 | 1.35 |
| FOX RIVER | 1.38 | 1.21 | 1.40 | 1.32 | 1.20 | 1.41 | 1.16 | 1.33 | 1.45 |
| LASER PRINT | 1.46 | 1.31 | 1.48 | 1.33 | 1.30 | 1.49 | 1.27 | 1.36 | 1.45 |
| X-9000 | 1.47 | 1.30 | 1.50 | 1.41 | 1.34 | 1.45 | 1.25 | 1.44 | 1.45 |
| 4200 DP | 1.28 | 1.06 | 1.25 | 1.33 | 1.02 | 1.34 | 1.03 | 1.36 | 1.36 |
| 1ST CHOICE | 1.46 | 1.28 | 1.49 | 1.32 | 1.30 | 1.50 | 1.20 | 1.43 | 1.51 |
| MSP | 1.27 | 1.11 | 1.31 | 1.34 | 1.17 | 1.35 | 1.12 | 1.27 | 1.39 |
| REGALIA | 1.40 | 1.17 | 1.39 | 1.31 | 1.20 | 1.43 | 1.19 | 1.33 | 1.43 |
| RELAY DP | 0.90 | 0.75 | 0.86 | 1.08 | 1.24 | 0.99 | 0.74 | 1.05 | 1.03 |
| TIDAL DP | 0.96 | 0.79 | 0.92 | 1.10 | 0.83 | 1.03 | 0.79 | 1.03 | 1.01 |
| XERO LASER | 1.29 | 1.18 | 1.38 | 1.27 | 1.21 | 1.33 | 1.17 | 1.32 | 1.38 |

TABLE 3

AVERAGE OPTICAL DENSITY - BEFORE FUSER ASSEMBLY

| INK # | Average Optical Density - Higher Quality Paper | Average Optical Density - Other Paper | Average Optical Density - All Papers Tested |
|---|---|---|---|
| 1 | 1.52 | 1.18 | 1.31 |
| 2 | 1.28 | 0.97 | 1.13 |
| 3 | 1.47 | 1.15 | 1.31 |
| 4 | 1.37 | 1.28 | 1.33 |
| 5 | 1.24 | 1.05 | 1.15 |
| 6 | 1.48 | 1.19 | 1.34 |
| 7 | 1.23 | 0.92 | 1.08 |
| 8 | 1.44 | 1.24 | 1.34 |
| 9 | 1.52 | 1.30 | 1.41 |

The optical density data of Table 4 were then averaged as shown in Table 5.

TABLE 5

AVERAGE OPTICAL DENSITY - AFTER FUSER ASSEMBLY

| INK # | Average Optical Density - Higher Quality Paper | Average Optical Density - Other Paper | Average Optical Density - All Papers Tested |
|---|---|---|---|
| 1 | 1.39 | 1.03 | 1.21 |
| 2 | 1.22 | 0.87 | 1.05 |
| 3 | 1.41 | 1.07 | 1.24 |
| 4 | 1.33 | 1.19 | 1.26 |
| 5 | 1.22 | 1.03 | 1.13 |
| 6 | 1.42 | 1.11 | 1.27 |
| 7 | 1.18 | 0.87 | 1.03 |

TABLE 5-continued

AVERAGE OPTICAL DENSITY - AFTER FUSER ASSEMBLY

| INK # | Average Optical Density - Higher Quality Paper | Average Optical Density - Other Paper | Average Optical Density - All Papers Tested |
| --- | --- | --- | --- |
| 8 | 1.37 | 1.12 | 1.25 |
| 9 | 1.43 | 1.20 | 1.32 |

The average optical density data in Tables 3 and 5 show that, whether the printed ink is passed through the fuser assembly or not, the ink numbered 9, an ink composition according to the invention comprising, by weight, 2.5% pigment and 5.5% hollow polymeric capsules, gave an optical density superior to the control ink numbered 3, comprising 2.5%, by weight, pigment but no hollow polymeric capsules. Further, the ink numbered 9 gave an optical density superior to the control ink numbered 6, which contained 4.0%, by weight, pigment but no hollow polymeric capsules. Thus, the addition of hollow polymeric capsules results in improved optical density even when the pigment level is decreased.

EXAMPLE 2

Inks tested in Example 1 were tested for wet rub resistance. In this Example, the inks were printed on paper, and then passed through a fuser assembly to apply pressure and heat as disclosed in Example 1. After a dry time of ten minutes, water was placed on the paper and then rubbed by hand with a clean Kimwipe™ and any degree of smearing was observed and rated. An excellent resistance to wet rub was rated as 0, a good resistance to wet rub was rated as 1, an average resistance to wet rub was rated as 2, and a poor resistance to wet rub was rated as 3. The results of this test are shown in Table 6.

TABLE 6

WET RUB RESISTANCE - AFTER FUSER ASSEMBLY

| INK # | Wt. % Hollow Polymeric Capsules | WET RUB RESISTANCE |
| --- | --- | --- |
| 1 | 2.75 | 2.5 |
| 4 | 5.50 | 1 |
| 6 | 0 | 3 |
| 8 | 2.75 | 2 |
| 9 | 5.50 | 0 |

As can be seen in Table 6, inks numbered 1, 4, 8 and 9, ink compositions according to the invention comprising hollow polymeric capsules, showed a superior wet rub resistance when compared to control ink numbered 6, which did not comprise hollow polymeric capsules. Thus, the addition of hollow polymeric capsules improves the wet rub resistance of inks.

COMPARATIVE EXAMPLE 3

A yellow ink composition, a cyan ink composition and a magenta ink composition were produced for use in a prior art ink system.

To produce a yellow ink concentrate, 78 grams of deionized water, 75 grams of 12% by weight of Lexmark Terpolymer Dispersant Solution as a dispersant, and 27 grams of Pigment Yellow 74 were combined to form a pre-mix composition. The pre-mix composition was mixed with an air stirrer to ensure that the pigment was thoroughly wet by the deionized water and dispersant. The pre-mix composition was then poured into an attritor containing 1.25 mm yttrium treated zirconium media. The attritor was jacketed to maintain the temperature at less than 35 C. The attritor was run for 12 hours to reduce the pigment's median particle size to less than 170 nm, as measured by a Honeywell Microtrac UPA150. 90 grams of deionized water were added to produce a yellow ink concentrate having a final solids content of 13% by weight.

A cyan ink concentrate was prepared using a fine media mill obtained from Eiger Machinery. 152 grams of deionized water, 200 grams of 12% by weight Lexmark Terpolymer Dispersant Solution as a dispersant and 48 grams Pigment Blue 15:4 were combined to form a pre-mix composition. The premix composition was mixed in an air stirrer to ensure that the pigment was thoroughly wet by the deionized water and dispersant. The premix composition was then transferred to a mill containing 0.6–0.8 mm polystyrene media. The premix composition was allowed to circulate through the mill containing the media, and was agitated by disks that protruded from a central shaft toward the mill's walls. The pre-mix composition was milled until the median particle size of the pigment was less than 170 nm, as measured by a Honeywell Microtrac UPA 150. These steps resulted in the cyan ink concentrate, which was then drained from the mill.

A magenta ink concentrate was also prepared using a fine media mill (Eiger Machinery). 152 grams of deionized water, 200 of grams 12% by weight Lexmark Terpolymer Dispersant Solution and 48 grams of Pigment Red 122 were mixed and processed in the same manner as the cyan ink concentrate.

Yellow, cyan and magenta ink compositions were prepared by first mixing all ink components except the ink concentrates for 10 minutes, then slowly adding the ink components to the ink concentrates while stirring. The ink compositions were then filtered using a 2 micron microfiber filter. The ink compositions were formulated as shown in Table 7:

TABLE 7

CONTROL INK COMPOSITIONS

| INK INGREDIENT | CYAN | YELLOW | MAGENTA |
| --- | --- | --- | --- |
| INK CONCENTRATE | 8.33 wt % | 15.38 wt % | 16.67 wt % |
| 1,3-PROPANEDIOL | 10 wt % | 0 wt % | 0 wt % |
| PEG 400[1] | 10 wt % | 10 wt % | 6.0 wt % |
| 2,2'-THIODIETHANOL | 0 wt % | 10 wt % | 8.0 wt % |
| GLYCEROL | 0 wt % | 0 wt % | 6.0 wt % |
| DEIONIZED WATER | 71.67 wt % | 64.62 wt % | 63.33 wt % |

[1]PEG 400 a.k.a. POLYETHYLENE GLYCOL 400

EXAMPLE 4

An Ink system was prepared according to the invention. The ink compositions in Table 8 were formulated with an amount of pigment ½ of that used in the ink compositions of Table 7. Yellow, cyan and magenta ink concentrates were prepared in the manner described in Comparative Example 3. Yellow, cyan and magenta ink compositions were prepared by first mixing all ink components except the ink concentrates for 10 minutes, then slowly adding the ink components to the ink concentrates while stirring. The ink compositions were then filtered using a 2 micron microfiber filter. The polymeric capsule to pigment ratio (based upon weight) was 2:1.

TABLE 8

INK COMPOSITIONS CONTAINING HOLLOW POLYMERIC CAPSULES

| INK INGREDIENT | CYAN | YELLOW | MAGENTA |
| --- | --- | --- | --- |
| INK CONCENTRATE | 4.17 wt % | 7.69 wt % | 8.33 wt % |
| 1,3-PROPANEDIOL | 10 wt % | 0 wt % | 0 wt % |
| PEG 400[1] | 10 wt % | 10 wt % | 6.0 wt % |
| 2,2'-THIODIETHANOL | 0 wt % | 10 wt % | 8.0 wt % |
| GLYCEROL | 0 wt % | 0 wt % | 6.0 wt % |
| POLYMERIC CAPSULES @ 37 wt % SOLIDS[2] | 5.4 wt % | 4.05 wt % | 10.80 wt % |
| DEIONIZED WATER | 71.67 wt % | 64.62 wt % | 60.87 wt % |

[1]PEG 400 a.k.a. POLYETHYLENE GLYCOL 400
[2]POLYMERIC CAPSULES OBTAINED FROM ROHM & HAAS AS A 37% SOLIDS AQUEOUS SOLUTION

The ink compositions of Table 7 were filled into ink jet cartridges of an Encad NovaJet Pro™ printer, for use as an ink system and printed onto Boise Cascade X-9000 paper. The ink compositions of Table 8, containing polymeric capsules, were also filled into ink jet cartridges of an Encad NovaJet Pro™ printer for use as an ink system and printed onto Boise Cascade X-9000 paper.

The data set forth in Table 9, below, indicate that wet rub resistance of the pigment ink compositions improves with fusing.

TABLE 9

WET RUB RESISTANCE OF INKS OF EXAMPLE 4

| INK | BEFORE FUSING | AFTER FUSING |
| --- | --- | --- |
| Cyan | 1.5 | 0.25 |
| Yellow | 1.5 | 0 |
| Magenta | 2 | 0 |

To determine each ink system's color gamut, a square block of each color within the ink system was printed with each block containing 100% of that color. Red, green and blue blocks were then printed with each containing equal amounts of each respective primary color by overspraying a second primary color over a first color. After drying, L*, a*, b* from the CIELAB Color Scale values were measured for all six blocks using a Minolta Spectrophotometer. Using a Cartesian coordinate system, a* is plotted on the x axis and b* on the y-axis for each of these points. Lines are then drawn to connect the points. The area circumscribed is directly related to the size of the color gamut, that is, the number of colors which can be produced by the ink set. Likewise, the L*, a*, b* values are measured for the yellow, cyan, magenta, red, green and blue color square blocks of the second ink set. The a*, b* points are plotted on the same graph. The areas are compared, the set of the largest area is said to have the largest color gamut.

Figure 2:
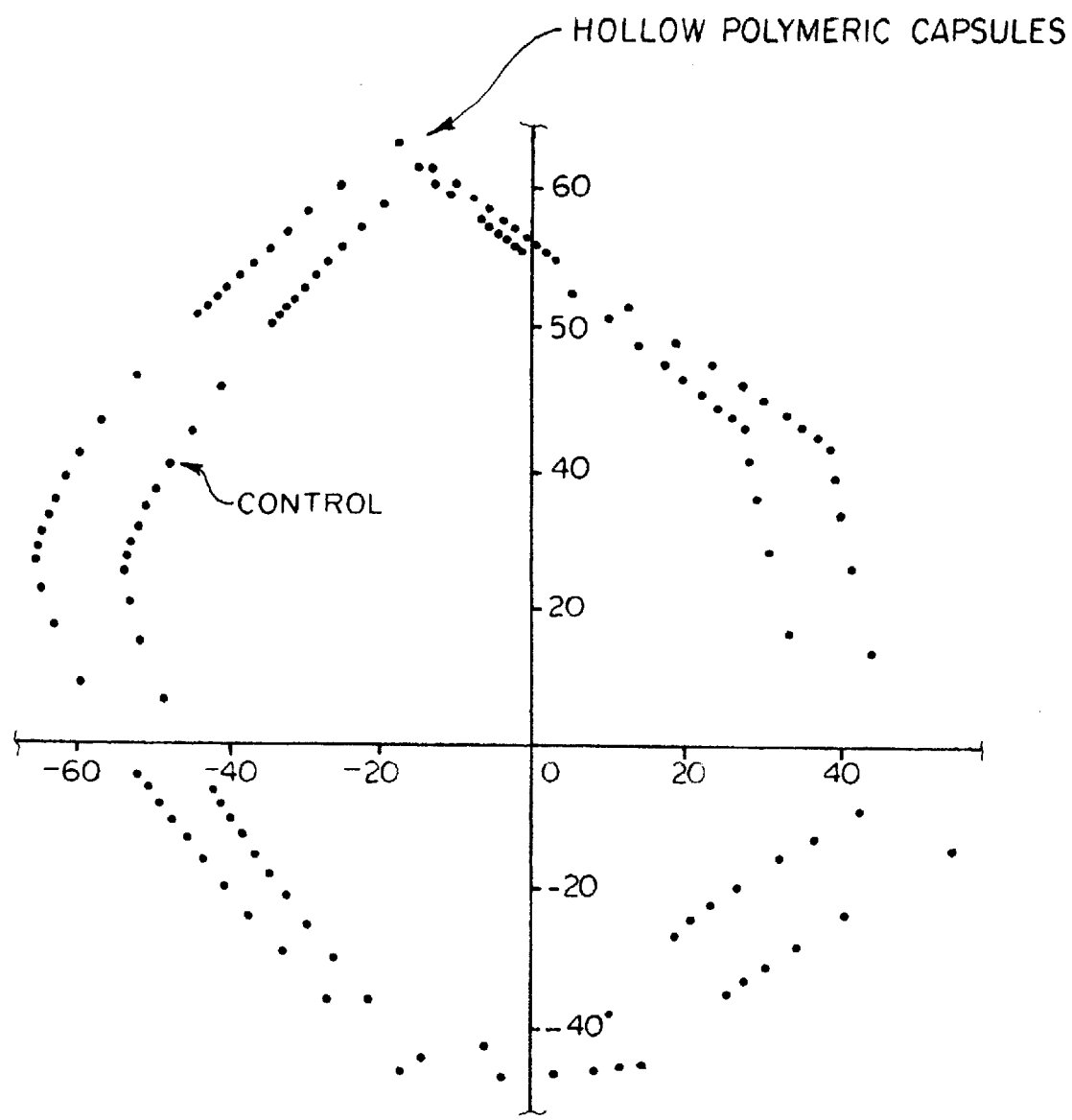
FIG. 2 is a graph showing theoretical color gamut for various ink systems.

As shown in FIG. 2, the theoretical color gamut of the ink system containing the polymeric capsules is 135% of the theoretical color gamut of the prior art ink system of Table 7 when corrected for pigment loading. Thus, the addition of hollow polymeric capsules to an ink system improves the resulting color gamut.

As used herein, all ratios and all percentages are by weight unless otherwise specified.

Additional embodiments and modifications within the scope of the claimed invention will be apparent to one of ordinary skill in the art. Accordingly, the scope of the present invention shall be considered in the terms of the following claims, and is understood not to be limited to the details of the methods described in the specification.

We claim:

1. A method of applying an ink composition to a substrate, wherein the ink composition comprises a carrier medium, a colorant, and polymeric capsules having central cavities containing water; said method comprising applying the ink composition to the substrate and then applying heat and pressure to the ink composition.

2. The method of claim 1, wherein the heat is applied at a temperature of about 100 C. to about 250 C.

3. The method of claim 1, wherein the pressure is applied at about 18 to about 26 pounds per square inch.

4. The method of claim 1, wherein the substrate is paper.

5. The method of claim 1, wherein the ink composition is applied by spraying.

6. The method of claim 1, wherein an additional ink composition is applied to the substrate, the additional ink composition having a different color than the ink composition.

7. The method of claim 6, wherein a cyan ink composition, a yellow ink composition, and a magenta ink composition are applied to the substrate.

8. The method of claim 1, wherein the polymeric capsules have an outer diameter of less than one micron.

9. The method of claim 1, wherein the ink composition comprises about 2% to about 10% by weight of polymeric capsules.

10. The method of claim 1, wherein the ink composition comprises about 0.5% to about 10% by weight of pigment.

11. The method of claim 1, wherein the polymeric capsules comprise polystyrene shells.

12. A ink system comprising at least two ink compositions, wherein at least one ink composition comprises:
(a) a carrier medium;
(b) a colorant other than a white pigment;
(c) polymeric capsules having central cavities containing water;
wherein the at least one ink composition is substantially free of a film-forming resin.

13. The ink system of claim 12, wherein the at least one ink composition further comprises a dispersant selected from the group consisting of cationic dispersants, anionic dispersants, zwitterionic dispersants, and amphoteric dispersants.

14. The ink system of claim 13, wherein the dispersant is an anionic dispersant.

15. The ink system of claim 12, wherein the at least one ink composition is substantially free of polyamines.

16. The ink system of claim 12, wherein the polymeric capsules have an outer diameter of less than one micron.

17. The ink system of claim 12, wherein the at least one ink composition comprises about 2 to about 10% by weight of polymeric capsules.

18. The ink system of claim 12, wherein the at least one ink composition comprises about 0.5 to about 10% by weight of pigment.

19. The ink system of claim 12, wherein the polymeric capsules comprise polystyrene shells.

20. The ink system of claim 12, wherein the at least one ink composition further comprises a humectant.

21. The ink system of claim 12, wherein the colorant is selected from the group consisting of azo pigments, polycyclic pigments, nitro pigments, carbonates, chromates and carbon black.

22. A method of increasing the color gamut of an ink system, comprising the step of providing an ink system with at least one ink composition comprising:
  (a) a colorant and
  (b) polymeric capsules comprising polymer shells and having central cavities.

23. A method according to claim 22, wherein the at least one ink composition is substantially free of film-forming resins and polyamines.

24. A method according to claim 22, wherein the at least one ink composition comprises, by weight:
  (a) no more than about 20% colorant; and
  (b) at least about 2% polymeric capsules; and
wherein the composition further comprises, by weight:
  (c) at least about 15% carrier medium.

25. A method according to claim 22, wherein the central cavities of the polymeric capsules contain water.

26. A method according to claim 25, wherein the polymer is selected from the group consisting of polystyrene and acrylic/styrene copolymers.

27. A method according to claim 26, wherein the ink system comprises a cyan ink composition, a yellow ink composition, and a magenta ink composition.

28. A method according to claim 26, wherein each of the ink compositions comprise polymeric capsules comprising polymer shells and having central cavities.

29. A method of applying an ink composition to a substrate, wherein the ink composition comprises a carrier medium, a colorant, and polymeric capsules having central cavities containing water; said method comprising applying the ink composition to the substrate and then applying heat to the ink composition.

30. The method of claim 29, wherein the heat is applied at a temperature of about 100 C. to about 250 C.

31. The method of claim 29, wherein the substrate is paper.

32. The method of claim 29, wherein the ink composition is applied by spraying.

33. The method of claim 29, wherein an additional ink composition is applied to the substrate, the additional ink composition having a different color than the ink composition.

34. The method of claim 33, wherein a cyan ink composition, a yellow ink composition, and a magenta ink composition are applied to the substrate.

35. The method of claim 29, wherein the polymeric capsules have an outer diameter of less than one micron.

36. The method of claim 29, wherein the ink composition comprises about 2% to about 10% by weight of polymeric capsules.

37. The method of claim 29, wherein the ink composition comprises about 0.5% to about 10% by weight of pigment.

38. The method of claim 29, wherein the polymeric capsules comprise polystyrene shells.

39. A composition comprising, by weight:
  (a) at least about 15% carrier medium;
  (b) colorant in an amount of no more than 20%;
  (c) at least about 2% polymeric capsules having central cavities containing water; and
  (d) a dispersant selected from the group consisting of cationic dispersants, anionic dispersants, zwitterionic dispersants, amphoteric dispersants and mixtures thereof;
wherein the composition is substantially free of a film-forming resin.

40. The composition of claim 38, wherein the dispersant is an anionic dispersant.

41. A composition comprising, by weight:
  (a) at least about 15% carrier medium;
  (b) colorant in an amount of no more than 20%; and
  (c) at least about 2% polymeric capsules having central cavities containing water;
wherein the composition is substantially free of a film-forming resin and the composition is substantially free of polyamines.

42. A composition comprising, by weight:
  (a) at least about 15% carrier medium;
  (b) colorant in an amount of no more than 20%; and
  (c) at least about 2% polymeric capsules having central cavities containing water;
wherein the composition is substantially free of a film-forming resin and the polymeric capsules have an outer diameter of less than micron.

43. A composition comprising, by weight:
  (a) at least about 15% carrier medium;
  (b) colorant in an amount of no more than 20%; and
  (c) about 2% to about 10% polymeric capsules having central cavities containing water;
wherein the composition is substantially free of a film-forming resin.

44. A composition comprising, by weight:
  (a) at least about 15% carrier medium;
  (b) colorant in an amount of no more than 20%; and
  (c) at least about 2% polymeric capsules having central cavities containing water;
wherein the composition is substantially free of a film-forming resin and the composition comprises from about 0.5% to about 10% by weight of pigment.

45. A composition comprising, by weight:
  (a) at least about 15% carrier medium;
  (b) colorant in an amount of no more than 20%; and
  (c) at least about 2% polymeric capsules having central cavities containing water;
wherein the composition is substantially free of a film-forming resin and the polymeric capsules comprise polystyrene shells.

46. A composition comprising, by weight:
  (a) at least about 15% carrier medium;
  (b) colorant in an amount of no more than 20%;
  (c) at least about 2% polymeric capsules having central cavities containing water; and
  (d) a humectant;
wherein the composition is substantially free of a film-forming resin.

47. A composition comprising, by weight:
  (a) at least about 15% carrier medium;
  (b) colorant in an amount of no more than 20%; and
  (c) at least about 2% polymeric capsules having central cavities containing water;
wherein the composition is substantially free of a film-forming resin and the colorant is selected from the group consisting azo pigments, polycyclic pigments, nitro pigments, carbonates, chromates, titanium oxides, zinc oxides, iron oxides, carbon black and mixtures thereof.

* * * * *